United States Patent [19]
Bove, Jr. et al.

[11] Patent Number: 5,946,425
[45] Date of Patent: *Aug. 31, 1999

[54] METHOD AND APPARATUS FOR AUTOMATIC ALINGMENT OF VOLUMETRIC IMAGES CONTAINING COMMON SUBJECT MATTER

[75] Inventors: V. Michael Bove, Jr., Wrentham; Tamas Sandor, Wellesley, both of Mass.

[73] Assignee: Massachusetts Institute of Technology, Cambridge, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/657,324

[22] Filed: Jun. 3, 1996

[51] Int. Cl.⁶ ...................................... G06K 9/36
[52] U.S. Cl. .......................... 382/294; 382/128; 382/276; 382/293
[58] Field of Search ..................................... 382/131, 154, 382/289, 294, 128, 130; 364/731, 554; 348/580; 600/425, 407; 250/363.04; 345/424

[56] References Cited

U.S. PATENT DOCUMENTS

| | | | |
|---|---|---|---|
| 4,710,876 | 12/1987 | Cline et al. | 364/414 |
| 4,719,585 | 1/1988 | Cline et al. | 364/518 |
| 4,977,505 | 12/1990 | Pelizzari et al. | 364/413.19 |
| 5,170,347 | 12/1992 | Tuy et al. | 364/413.16 |
| 5,359,513 | 10/1994 | Kano et al. | 364/413.13 |
| 5,531,520 | 7/1996 | Grimson et al. | 382/100 |
| 5,568,384 | 10/1996 | Robb et al. | 364/413.13 |
| 5,576,767 | 11/1996 | Lee et al. | 348/402 |
| 5,633,951 | 5/1997 | Moshfeghi | 382/131 |

OTHER PUBLICATIONS

Pelizzari et al., J. Comp. Assisted Tomography 13(1):20 (1989).
Borgefors, Trans. Pattern Analysis and Mach. Int. 10:849 (1988).
Alpert et al., J. Nuc Med. 31:1717 (1990).
Woods et al., J. Comp Assisted Tomography 16:620 (1992).
van Herk et al., Med. Phys. 21(7):1163 (1994).
Collins e al., J. Comp. Assisted Tomography 18(2):192 (1992).
Evans et al., SPIE 1092:264 (1989).
Excerpt from Klaus et al., Robot Vision (1986).
Weizhao Zhao et al., "Registration and three–dimensional reconsruction of autorad" IEEE transaction on medical imaging , vol. 12, No. 4, Dec. 1993.

*Primary Examiner*—Christopher S. Kelley
*Assistant Examiner*—Sheela Chawan
*Attorney, Agent, or Firm*—Cesari and McKenna, LLP

[57] ABSTRACT

Different tomographic images of the same subject matter are optimally related to one another through a two-step procedure whereby, first, movements are plotted on a subregion level, producing a vector map relating subregions in a first set of scan frames to subregions in another set of scan frames; and then, based on the aggregate of subregion movements, the invention characterizes the "global" displacement relating the volume represented by the first set of scan frames to that represented by the second set. More specifically, the invention generates translation and rotation vectors that describe the movements underlying shifts in subject matter from one scan to the other, and which can be applied to one frame set to align it with the other.

18 Claims, 6 Drawing Sheets

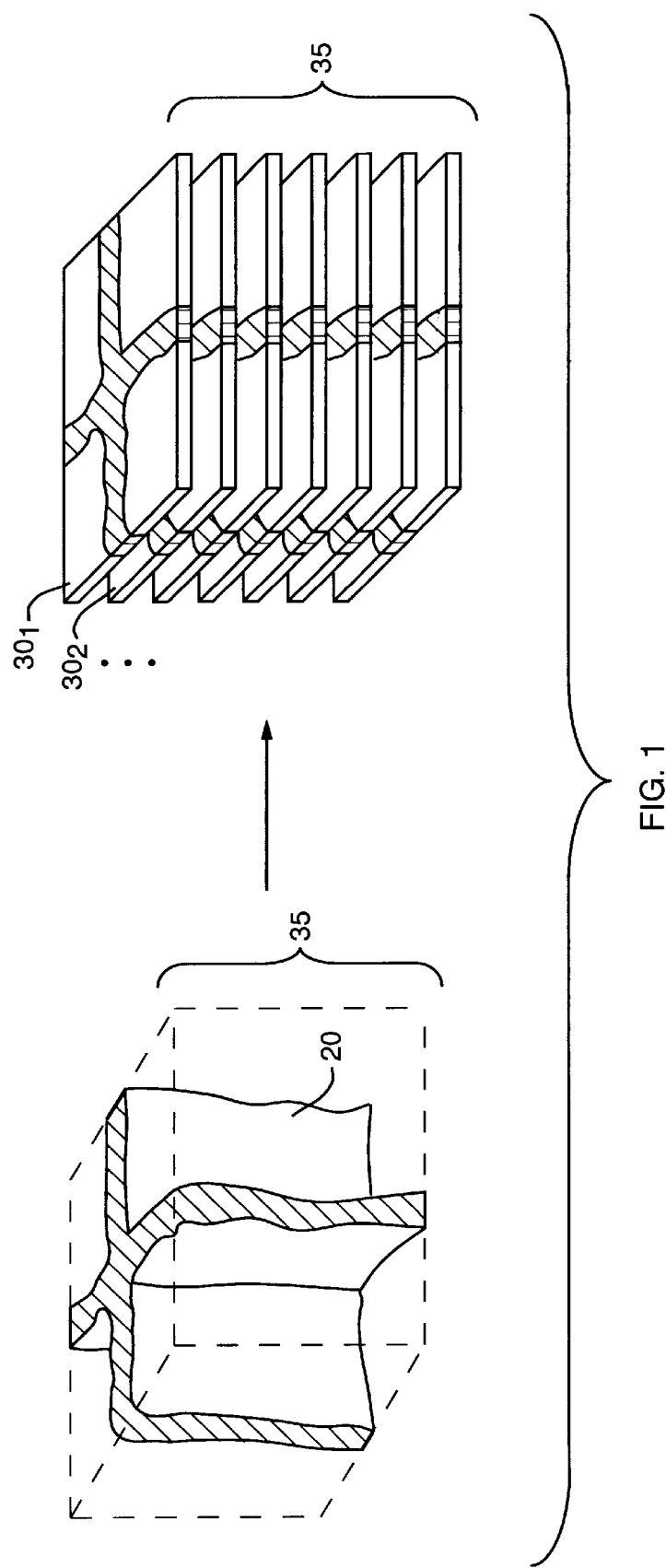

METHOD AND APPARATUS FOR AUTOMATIC ALINGMENT OF VOLUMETRIC IMAGES CONTAINING COMMON SUBJECT MATTER

GOVERNMENT FUNDING

This invention was made with government support under Grant Number NIH/HIA PO1 AG04953-11, awarded by the National Institutes of Health. The government has certain rights in the invention.

FIELD OF THE INVENTION

The present invention relates to volumetric (e.g., medical) imaging, and in particular to methods and apparatus for comparing and aligning multiple volumetric images encoded as series of contiguous planar slices.

BACKGROUND OF THE INVENTION

Computer tomographic imaging technologies facilitate analysis of volumetric anatomical structures by providing a series of cross-sectional slices that collectively define a structure. Using any of various techniques, such as ultrasound, positron emission, X-rays (in the case of CT scans) or nuclear magnetic resonance (in the case of MRI scans), a sensor array scans through the structure at closely spaced intervals; the nature of the information appearing in each cross-sectional slice depends on the imaging modality and its interactions with the various physiological and non-physiological components of the structure and its surroundings.

A single scan, however, may not suffice for clinical diagnosis, therapy planning, detection of anatomical or functional changes, or outcome evaluation. For these purposes it is frequently necessary to conduct a plurality of scans to permit comparison of results. However, in order to relate sets of tomographic images to one another, the individual slices must be superposable with considerable precision. Ordinarily, and despite the best efforts of technicians, movement of the sensor array, the patient, or even the anatomical structure under study shift the positions of imaged subject matter in one scan relative to another scan. The use of different imaging modalities or different imaging protocols within one modality can complicate matters still further, since fluctuations in equipment response and clinical-anatomical changes in the examined subject typically alter the contrast and shape of imaged components. Indeed, this is frequently the very reason for utilizing multiple modalities: pooling the special capabilities of different imagers into a common space provides a combined image containing more information than could be generated using any particular modality in isolation. For example, the high-quality bone information obtained with a CT scan can be combined with the high-quality tissue information obtained with an MRI scan of the same anatomy.

Accordingly, numerous techniques have been employed to bring the various image slices of different scans of the same subject into registration, a process known as "intrasubject alignment." The result of the process is a transformation that best maps corresponding features from one image set to another, so that corresponding features of different images occupy equivalent spatial locations. The prior art includes rigid-body techniques; piecewise linear and nonlinear algorithms; the matching of principal axes, homologous points, surface contours, homologous surfaces, or corresponding high-curvature lines on surfaces; and three-dimensional image correlation.

These techniques can be categorized somewhat loosely as either correlation methods that utilize pixel values directly; algorithms that utilize low-level features such as edges; and algorithms that utilize high-level features that are recognized as subelements of the imagery. Most of these techniques are "feature-based" in the sense that they require either the operator or the algorithm to identify corresponding anatomic structures in both the original and target image stacks, or, alternatively, to remove structures (such as the scalp and skull meninges). Either requirement introduces an additional source of error; in particular, operator error can be severe on occasion and is reduced only through elaborate training in the the technique and the relevant anatomy. Pixel-based algorithms, on the other hand, can exhibit sensitivity to missing data. More generally, although the computational speed of available imaging workstations is high and increasing, the alignment procedures for whole-volume (three-dimensional) sampling still require considerable computational capacity and prolonged execution times.

DESCRIPTION OF THE INVENTION

Brief Summary of the Invention

The present invention dispenses entirely with the need to identify corresponding anatomical landmarks in reference and target scanslices; that is, the technique does not need outside "help" (human or computational) to facilitate processing. On the other hand, the invention does not operate at the level of single pixels, and so is not compromised by the absence of exact pixel-to-pixel correspondences (due, for example, to spurious missing data). And processing is based on two-dimensional operations—the invention does not require volumetric operations, and so is computationally tractable.

Briefly, the invention characterizes rotation and translation through a two-step procedure whereby, first, movements are plotted on a subregion level, producing a vector map relating subregions in a first set of scan slices to subregions in another set of slices; and then, based on the aggregate of subregion movements, the invention characterizes the "global" displacement relating the volume represented by the first set of scan slices to that represented by the second set. More specifically, the invention generates translation and rotation vectors that describe the movements underlying shifts in subject matter from one scan to the other, and which can be applied to one set of slices to align it with the other.

Preferably, the image slices are first preprocessed to reduce the noise that accompanies tomographic imaging. Preprocessing further limits comparisons to features in a size range meaningful given the structures under study.

The invention then applies a local process that generates an array of translation vectors, mapping small subregions of one volume into equivalent subregions of the other. The result is a field of vectors which, although capable of representing movement among slices as well as within corresponding versions of a singleslice, each encode translational movement along a single dimension—eliminating the need both for complicated rotation computations and three-dimensional processing.

Finally, the invention identifies, as between the volumes represented by the slice stacks, the rigid-body motion (including both rotational and translational parameters) that is most consistent with the vector field. Thus, although rotation is eliminated as a concern during the intensive iterative processing required to generate the vector field, it is recovered in solving for global displacement. The resulting rotational and translation vectors are used to align user-specified portions of the two image sets.

BRIEF DESCRIPTION OF THE DRAWINGS

The foregoing discussion will be understood more readily from the following detailed description of the invention, when taken in conjunction with the accompanying drawings, in which:

FIG. 1 schematically illustrates the manner in which a three-dimensional structure is decomposed tomographically into a series of planar slices;

DETAILED DESCRIPTION OF THE PREFERRED EMBODIMENTS

Refer first to FIGS. 1–3, which illustrate a representative operating environment for the present invention, as well as the sources of the volumetric registration errors the present invention corrects. In FIG. 1, a generally cruciform structure 20 is decomposed by computed tomography into a series of successive planar slices or sections $30_1$, $30_2$, etc. that collectively describe a volume 35. Although the set of slices captures the original structure 20, each can be analyzed in isolation, revealing both external and internal aspects of the structure at the level through which the section extends. In electronic-imaging terms, each slice is represented by a series of picture elements, or "pixels," arranged in discrete locations on a planar grid. However, each slice is treated as having a volumetric thickness so that the set of slices corresponds to the original volume, and the pixels are referred to as "voxels." Herein, the term "pixel" is employed generically to refer to a picture element on a two-dimensional "pixelmap" grid, without regard to the third dimension of its location; and a "voxel" refers to a pixel having an (x,y) coordinate defining its position within a slice, and a z coordinate defining the location of the slice itself. In other words, voxels, but not pixels, have thickness.

Each pixel also has photometric parameters associated with it, and which define its appearance. In the simplest case of a binary, monochrome pixel, the parameter reflects either an "on" state or an "off" state; more commonly, however, monochrome pixels can appear at different brightness levels as determined by a luminance parameter, and colored pixels have chrominance parameters that specify their hues.

Figure 2B:
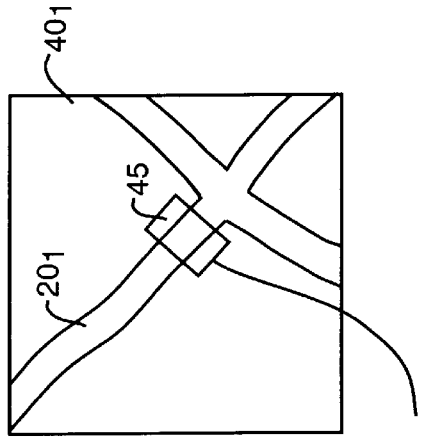
FIGS. 2A and 2B are plan views of corresponding slices from two separate tomography scans, illustrating the results of two-dimensional translation and rotation (i.e., movement within a slice)
Figure 2A:
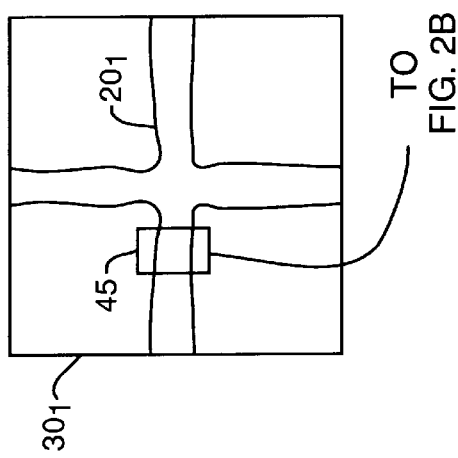

FIGS. 2A and 2B illustrate the manner in which imaged subject matter can shift two-dimensionally between successive scans. In slice $30_1$, the section $20_1$ of structure 20 is centered within the frame; but in slice $40_1$, the corresponding slice from a subsequent scan, section $20_1$ has been displaced (somewhat exaggeratedly) by both rotation and translation, so that a patch 45, in order to cover common subject matter in both slices, must be moved in accordance with that displacement.

Figure 3B:
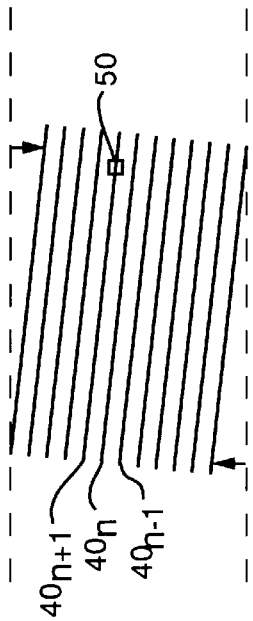
FIGS. 3A and 3B are elevational views of sets of slices from two separate tomography scans, illustrating the results of three-dimensional movement from one tomography scan to another (i.e., movement among the slices themselves rather than within a slice)
Figure 3A:
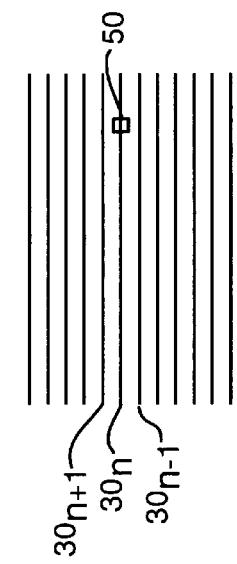

Displacement can be volumetric—that is, occur between slices rather than within a slice—as shown in FIGS. 3A and 3B. Slices $30_n$ and $40_n$, for example, are presumed to correspond with one another. However, the slices in FIG. 3B have been volumetrically rotated with respect to those in FIG. 3A as shown by the arrows; this can result from relative torsional movement of the sensors, the patient, or the anatomical structure under study. As a result, the feature 50 is not represented, as expected, in slice $40_n$; instead it appears in $40_{n+1}$. A feature located on the opposite side of slice $30_n$ would appear in slice $40_{n-1}$. Subject matter can also shift among slices due to simple volumetric translation rather than rotation, in which case slice correspondences must be reordered.

In either or both cases, bringing the images into alignment requires characterization of the intraframe and interframe movements, and processing to correct for these. In the case of electronically encoded images, the correction can be effected by applying the appropriate parameters to the pixels of a target image in order to bring them into the proper locations relative to a reference image.

Figure 4:
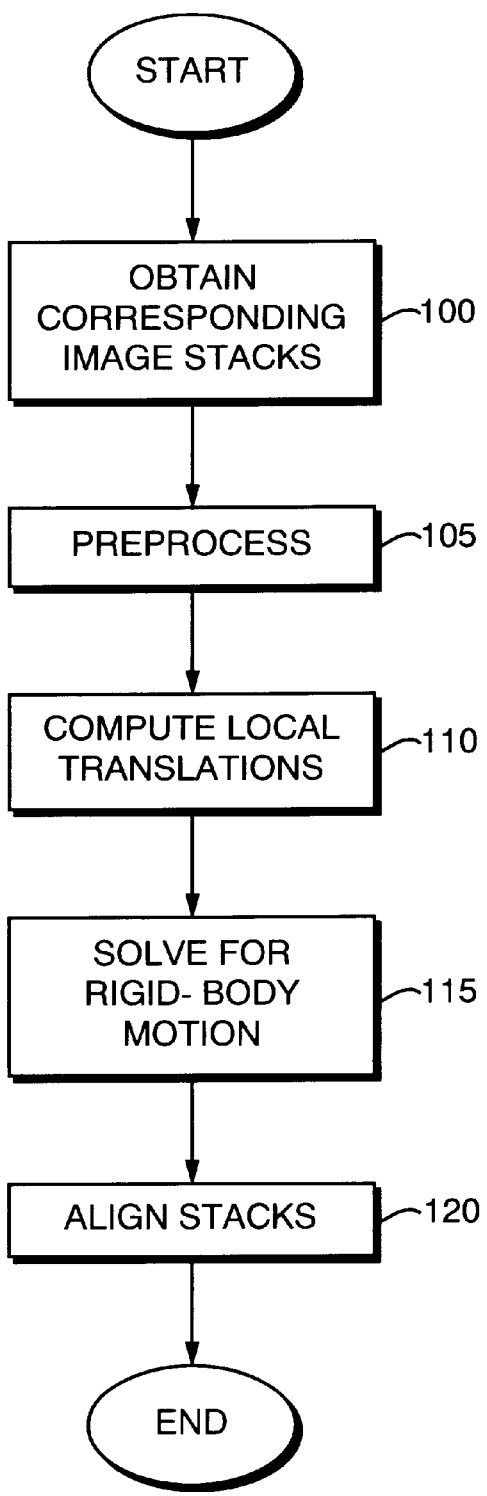
FIG. 4 is a flow chart illustrating the basic operational sequence of the invention.

Operation of the present invention is summarized in FIG. 4. In a first step 100, presumed correspondences between the slices of two image stacks are established. In other words, assuming that the two scans were made in perfect volumetric registration, corresponding slices ($30_1$ and $40_1$, $30_2$ and $40_2$, etc.) are located and their relationships identified.

In step 105, the image is preprocessed before application of the alignment analysis. The need for preprocessing arises from the possibility that the sensors used to create the two scans may have slightly different gain and bias characteristics, and from the potential for interference by irrelevant anatomical structures. Preprocessing limits comparisons to features in a size range meaningful given the structures under study (eliminating, in particular, high-frequency noise).

In steps 110 and 115, the images are related to one another, first by movements of small image subregions and then by a gross volumetric movement derived from the subregion movements. Using the parameters defining volumetric movement, either stack of slices can be aligned with the other.

1. Preprocessing

Treating the image as a sampled signal, the frequency of the signal directly reflects the size of image features. Accordingly, bandpass filtering eliminates features corresponding to frequencies outside the band. We have found that convolving all of the images with a bandpass filter, preferably the Laplacian of a Gaussian (commonly noted as $\nabla^2 G$) applied over both image dimensions (x,y), represents an effective approach to eliminating features having no anatomical relevance and also to reducing noise. The two-dimensional $\nabla^2 G$ filter is radially symmetric, and therefore nonseparable:

$$\nabla^2 G(r) = \frac{e^{\frac{-r^2}{2\sigma^2}}}{\pi\sigma^4}\left(1 - \frac{r^2}{2\sigma^2}\right)$$

where σ determines both the width of the passband and its center. This equation is used to generate a filter kernel, with r specifying its two-dimensional extent (from the center). The image is treated as the product of a sampled signal, and the filter is applied to that signal (that is, the kernel is convolved with the image); the filtered signal is then resampled to reconstruct the filtered image.

It is preferable, however, to perform an additional non-linear step to correct for gain and bias differences. One such step recognizes that the filtered image signal is bipolar (i.e., includes values on both sides of zero), and converts the bipolar, bandpass image into a zero-crossing image—i.e., a binary image with pixels "turned off" everywhere except where the bandpass image goes through zero, where pixels are "turned on." Because the actual zero crossings will typically fall between discrete locations on the pixel grids, a convention is adopted (e.g., turning on the pixel on the negative side of any transition) and applied consistently throughout the image. Alternatively, the image can be converted into a "signed" zero-crossing image by setting the pixel to a negative value (e.g., −1) on the negative side of a transition and to a positive value (e.g., +1) on the positive side of a transition.

We have obtained good results using a filter where σ=2.0 pixels, which requires a convolution kernel of 15×15 pixels. It should be stressed, however, that variations are possible, not only to the filter parameters but to the filter itself and the nonlinear step. Other linear lowpass, highpass or bandpass filters can be used to single out features within a size range likely to yield good matches, and other nonlinearities will also assist matching and reduce noise.

2. Characterizing Local Movements

The invention characterizes the displacement relating the two sets of image frames in two stages, first by capturing movement on a subregion level, treating the different frames and their subregions as independent; and then by treating the sets of frames as solid volumes, deriving a rigid-body motion maximally consistent with the subregion movements.

Movement of image subregions is recovered by a local process that generates a vector field, each vector mapping a small region in the reference slice to a corresponding region in a target slice. So long as both the subregions and the maximum expected rotations between scans are small, subregion movements can be represented as translations with acceptable accuracy. This avoids the difficult mathematics required to represent rotation directly; instead, rotation is captured by the collective translations of contiguous subimage regions.

The local mapping procedure is illustrated in FIGS. 5A–6B. A first block of pixels 150, preferably square and having a dimension of N pixels by N pixels, is identified in a slice R from a reference image stack; and a second block of pixels 160, having a dimension of M pixels by M pixels, is identified in a slice T from a target image stack—i.e., the stack to which the reference stack is being compared. The procedure locates the pixel block in the target stack most visually similar to the reference pixel block 150. Ordinarily, M is equal to or larger than N, so that block 160 constitutes a "search window" to which block 150 can be systematically compared. The size of M limits the maximum expected shift between images; for example, if a feature were (somewhat unrealistically) expected to shift by no more than ±1 pixel between sets of images, M could be set to N+2.

Figure 5A:
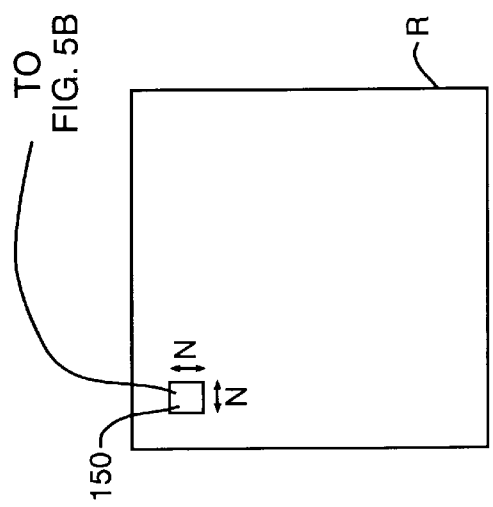
FIGS. 5A and 5B schematically illustrate the search procedure for relating subregions of a reference image to corresponding regions of a target image.
Figure 5B:
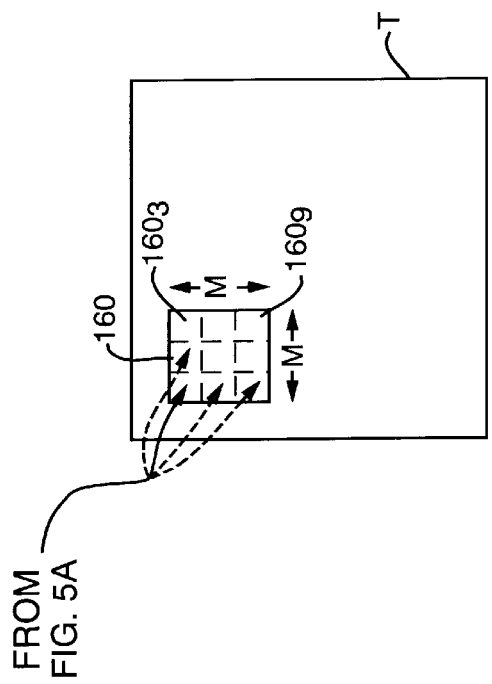

As shown in FIGS. 5A and 5B, the exemplary block 160 is nine times larger than block 150, so that block 150 may be sequentially "tiled" across block 160. The closeness of the match to each tile (two of which are representatively indicated at 160$_3$, 160$_9$)—or more specifically, the error signal or correlation—is noted.

If comparison against slice T yields ambiguous results or an insufficiently low error signal, it is assumed that block 150 has undergone interframe movement, and that its counterpart will be found in a slice other than slice T but in its immediate vicinity. The comparison process is repeated in a similarly sized and located search window in the slices adjacent to slice T on either side, progressing outwardly to subsequent slices until a suspected match is found or until the maximum expected interframe rotation or translation has been exceeded. Alternatively, the search can automatically extend to neighboring slice in order to avoid premature judgments concerning error magnitudes.

Figure 6A:
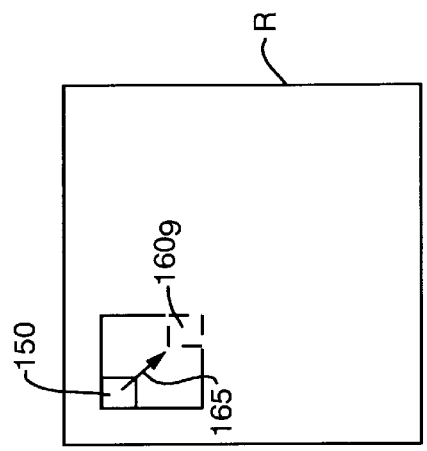
FIGS. 6A and 6B schematically illustrate association of each reference-image subregion with a vector that encodes its translational displacement in the target image.
Figure 6B:
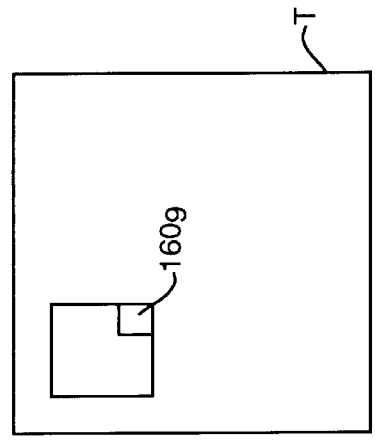

In any case, the pixel block in slice T or an adjacent slice associated with the smallest error signal is identified, and a translation vector relating block 150 to that pixel block is generated and associated with block 150. This is shown in FIGS. 6A and 6B, where it is assumed that the best match to block 150 is found at tile 160$_9$ in slice T. The equivalent region in slice R is shown in phantom, and a vector 165, which points to the equivalent region and whose magnitude reflects the distance thereto, is associated with block 150. The vector is not constrained to the two-dimensional surface of slice R, and can point to regions in other slices.

The procedure is repeated until all of the pixels of slice R have been mapped to corresponding regions in slice T, and may be implemented computationally by defining an error function $$err(i, j, k) = \sum_{y=0}^{N-1} \sum_{x=0}^{N-1} |R(x, y, z) - T(x+i, y+j, z+k)|$$

for −M/2≦(i,j,k)≦M/2, where the coordinates (x,y,z) lie at the center of block 150 and the coordinates (x+i, y+j, z+k) at the center of each search region; the z coordinate encodes a three-dimensional "voxel" location, i.e., pixel (x,y) in slice z, so that changes in z reflect interframe movement (with k=0 representing the corresponding slice in the target stack); and the quantities R(x,y,z) and T(x,y,z) each represent a numerical value associated with the denoted voxels in the R and T image stacks, respectively. Ordinarily, the value specifed is the luminance or chrominance of the voxel.

Each generated displacement vector has the form (x, y, z, $d_x$, $d_y$, $d_z$), where the coordinates x,y,z specify the center of the associated search region, and $d_x$, $d_y$, $d_z$ specify the three translational components of the displacement. For P blocks, the vectors will form an array or list of values of the form ($x_1$, $y_1$, $z_1$, $d_{x1}$, $d_{y1}$, $d_{z1}$), . . . , ($x_P$, $y_P$, $z_P$, $d_{xP}$, $d_{yP}$, $d_{zP}$). This list represents a vector field relating blocks in slices T with corresponding blocks in slices R.

The foregoing procedure assumes that intraframe or interframe movement occurs in discrete steps the size of block 150. It is possible to obtain greater accuracy by searching for matches to block 150 not by tiling as shown in FIG. 5B—that is, by comparing block 150 against adjacent N×N regions—but by overlapping the successive N×N search areas. For example, instead of moving the search area by N pixels to avoid overlap with the prior search area, it can be moved by N/2 pixels, or by as little as one pixel for the densest sampling. In practice, so long as N is sufficiently small, the additional accuracy gained through overlapping is more theoretical than real; the images are already noisy and filtered, and tend to exhibit some warping or other nonuniformities anyway.

Theoretical accuracy can also be improved through interpolation. For example, the search procedure might locate two matches of equivalent but imperfect accuracy in adjacent slices, implying that the true match lies in a hypothetical plane intervening between the two slices. This extra slice can be computationally generated by interpolating pixel values (e.g., chrominance and/or luminance) between the two planes. Once again, because the interframe scan distances realistically produced by current computed tomography equipment are usually small relative to the size of the anatomical structures under study, generally the need for interpolation is limited.

An exemplary implementation utilizes 256-by-256 pixel frames, and block and window sizes of N=16 pixels and M=32 pixels, respectively. This has been found to provide accurate results with acceptable computation times, and permits finding a translation of ±8 pixels in the plane. It should be understood, however, that the optimal sizes of the pixel blocks and search windows reflect a balance between sizes sufficient to facilitate recovery of meaningful translation and rotation values, but not so large as to be out of proportion to the features of interest (that is, the search window should not be so large that it might contain multiple instances of a target feature) or computationally intractable. It is expected that implementations with N=16 and M=48 will be optimal in terms of accuracy and execution time.

Figure 7:
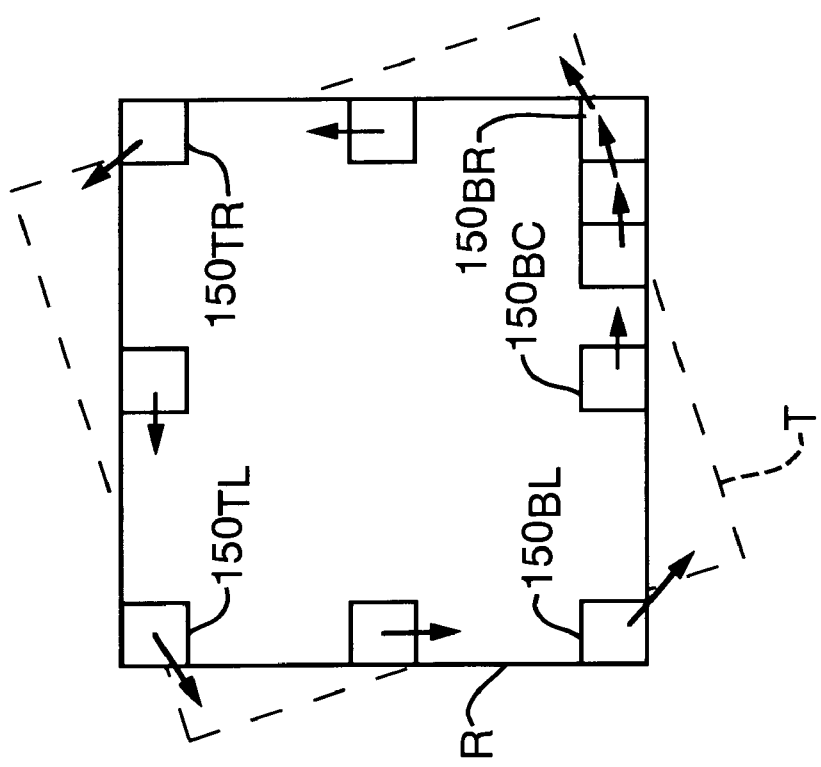
FIG. 7 illustrates the manner in which translational displacements can aggregate to capture rotation.

As noted earlier, so long as the blocks 150 and the degree of rotation between the volumes 35 of successive scans are sufficiently small, the translational displacements identified by foregoing procedure can collectively represent rotation. This is illustrated in FIG. 7, where the target slice corresponding to the reference slice has been rotated. The four corner blocks (i.e., top right block $150_{TR}$, top left block $150_{TL}$, bottom left block $150_{BL}$ and bottom right block $150_{BR}$) are associated with the most acute displacement vectors; the vector angles diminish toward the center of the edges until, as exemplified by the bottom center block $150_{BC}$, the angle is zero. A similar pattern of vectors occurs in interior blocks, and collectively, all of these vectors encode the illustrated rotation. Returning to the above-described 256×256 pixel implementation and assuming the rotation is around the center of the volume, the Cartesian distance from the center to one of the corner blocks is about 158 pixels. Since, as noted, the accuracy of the search procedure is approximately ±8 pixels, even with a maximum allowable error of only ±1 pixel it is possible to detect rotations up to $\tan^{-1}$ (±8/158) or ±2.9°. However, because the region of interest may not extend fully to the borders of theslice, this maximum distance may be less, resulting in larger identifiable planar rotations.

3. Characterizing Global Movement

Once the vector field has been established for all or a computationally sufficient number of search blocks, the vectors are analyzed collectively to determine the overall volumetric displacement they encode. In particular, the vectors are analyzed to produce the rotation vector $r=(r_x, r_y, r_z)$ and translation vector $t=(t_x, t_y, t_z)$ that minimize the sum of the squares of the error vectors e when applied to all of the displacement vectors:

$$d_i = r \times a_i + t + e_i$$

where $d_i$ is the ith displacement vector and $a_i$ is the center point $(x_i, y_i, z_i)$ of the search block associated with that vector.

These vectors can be recovered by characterizing both translation and rotation as a single 4×4 matrix V, which in a least-squares sense optimally maps one volume into the other. Recasting the array of values described above into a P×4 matrix X of the form $$\begin{bmatrix} x_1 & y_1 & z_1 & 1 \\ \vdots & \vdots & \vdots & \vdots \\ x_P & y_P & z_P & 1 \end{bmatrix}$$

and another P×4 matrix Y of the form $$\begin{bmatrix} x_1+d_{x1} & y_1+d_{y1} & z_1+d_{z1} & 1 \\ \vdots & \vdots & \vdots & \vdots \\ x_P+d_{xP} & y_P+d_{yP} & z_P+d_{zP} & 1 \end{bmatrix}$$

then X represents the original locations and Y the locations to which they are mapped according to the search results. The translation and rotation vectors V are found by computing a new 4×P matrix U that is the pseudoinverse of X:

$$U=(X^T X)^{-1} X^T$$

and multiplying U by Y:

$$V=UY.$$

Any (x,y,z) location in the first volume can be mapped to its corresponding location in the second volume by making a 4-vector (x,y,z,1) and multiplying that vector by the V matrix.

Other computational methods, such as the method of quaternions, can alternatively be employed to yield the translation and rotation vectors separately.

4. Hardware Implementation

Figure 8:
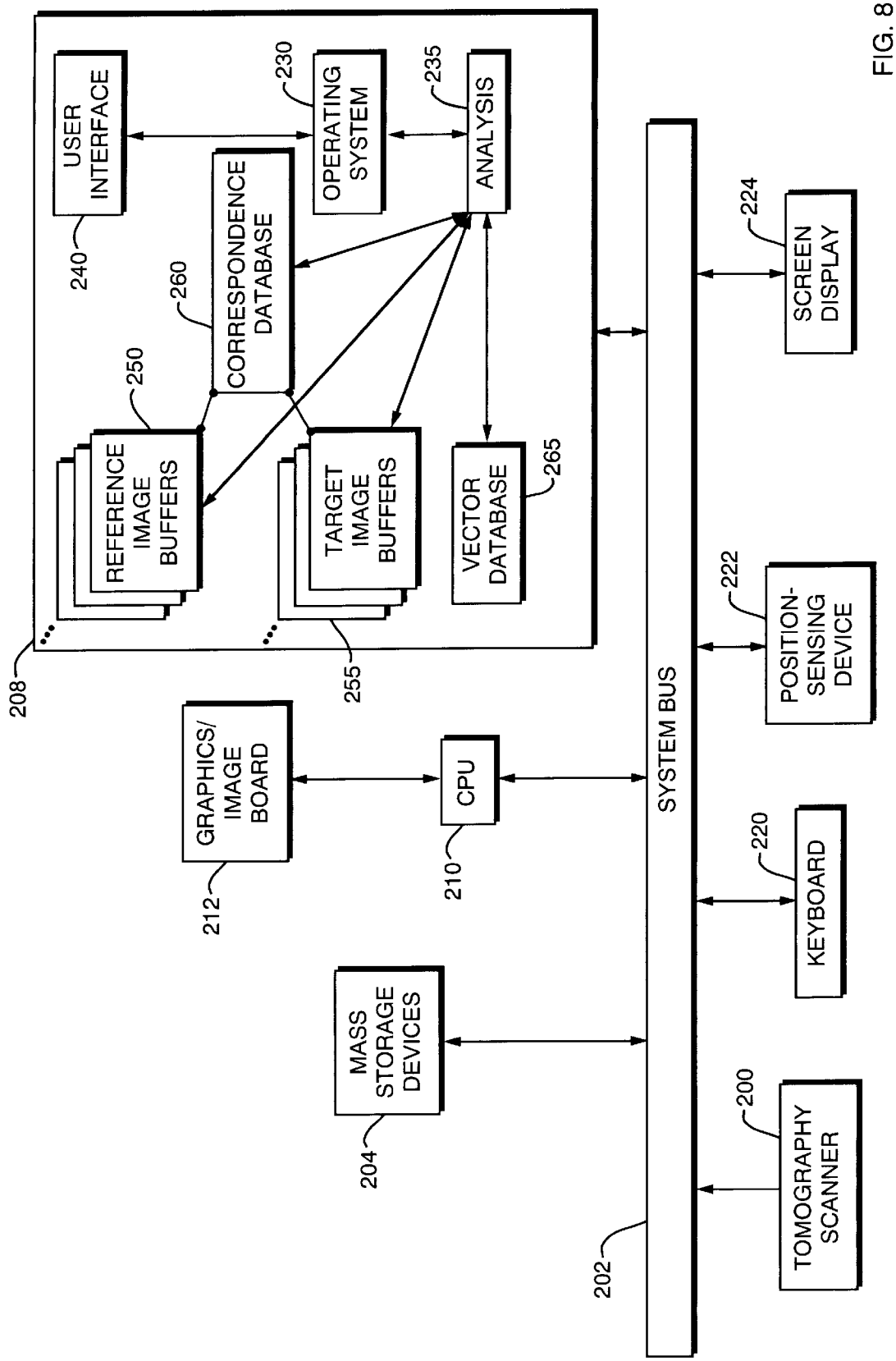
FIG. 8 is a block diagram illustrating a hardware implementation of the present invention.

Refer now to FIG. 8, which illustrates, in block-diagram form, a hardware system incorporating the invention. As indicated therein, the system includes a CT, MR or other imager 200, which generates volumetric slices of an object or region under study, supplying these in digitized form. The digitized tomographic frames are sent as bitstreams on a system bus 202, over which all system components communicate, and may be stored in a mass storage device (such as a hard disk or optical storage unit) 204 as well as in a main system memory 208 (specifically, within a partition defining a series of image buffers as discussed below).

The operation of the illustrated system is directed by a central-processing unit ("CPU") 210. To facilitate rapid execution of the image-processing operations hereinafter described, the system preferably contains a graphics or image-processing board 212; this is a standard component well-known to those skilled in the art.

The user interacts with the system using a keyboard 220 and a position-sensing device (e.g., a mouse) 222. The output of either device can be used to designate information or select particular areas of a screen display 224 to direct functions to be performed by the system.

The main memory 210 contains a series of frame buffers, databases, and a group of modules that control the operation of CPU 220 and its interaction with the other hardware components. An operating system 230 directs the execution of low-level, basic system functions such as memory allocation, file management and operation of mass storage devices 204. At a higher level, an analysis module 235, implemented as a series of stored instructions, directs execution of the primary functions performed by the invention, as explained below; and instructions defining a user interface 240 allow straightforward interaction over screen display 224. User interface 240 generates words or graphical images on display 224 to prompt action by the user, and accepts user commands from keyboard 220 and/or position-sensing device 224.

A first series of buffers 250 stores volumetric tomography slices from an initial or reference scan, and a second series of buffers 255 stores slices from a subsequent or target scan. Each buffer stores a single image slice as a "raster," i.e., a regular two-dimensional pattern of discrete pixel positions that collectively represent an image and may be used to drive (e.g., by means of image-processing board 212 or an image server) screen display 224 to display that image. The contents of each memory location in a frame buffer can directly govern the appearance of a corresponding pixel on display 224.

A correspondence database 260, representing a partition of memory 208, records two types of information: the order and interframe distance (i.e., the z displacement) among the slices represented in each of buffer sets 250, 255 and correspondences between the slices of buffer set 250 and those of buffer set 255. The displacement vectors $d_i$ are recorded in a vector database 265.

It must be understood that although the modules of main memory 208 have been described separately, this is for clarity of presentation only; so long as the system performs all necessary functions, it is immaterial how they are distributed within the system and the programming architecture thereof. Likewise, although conceptually organized as grids, pixelmaps need not actually be stored digitally in this fashion. Rather, for convenience of memory utilization and transmission, the raster pattern is usually encoded as an ordered array of pixels.

As noted above, execution of the key tasks associated with the present invention is directed by analysis module 235, which governs the operation of CPU 210 and controls its interaction with main memory 208 in performing the steps necessary to preprocess the image slices, establish the vector field and compute global rotation and translation.

Thus, in a representative implementation, a set of reference slices is stored in buffer set 250 and a set of target slices in buffer set 255. Analysis module 235 first loads correspondence database 260 with values that assume ordinal correspondence between each slice of the two buffer sets. Analysis module 235 then performs preprocessing of the slices as described above, including filtering and, if possible, establishing boundaries in each slice that will confine the search procedure to regions of possible interest and exclude other regions. As analysis module 235 searches local subimages of frames 250 against frames 255, it generates the vector field and updates correspondence database 260 if it finds that he ith frame of buffer set 250 does not, in fact, correspond to the ith frame of buffer set 255.

Finally, analysis module 235 computes the global rotation and translation vectors, storing these in vector database 265. When a user wishes to view reference and target slices in alignment, the user specifies the desired target slice and the mode of viewing. Analysis module 235 consults correspondence database 260 to locate the appropriate target slice and applies thereto the global vectors that relate the target slices to the reference slices, thereby aligning the subject matter in the target slice with that of the reference slice. The two slices can be shown on display 224 in any desired mode, such as side-by-side or superposed (e.g., in different colors), through conventional image-processing operations provided by board 212.

It will therefore be seen that the foregoing represents a highly efficient and advantageous approach to relating and combining different tomographic scans. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, the various modules of the invention can be implemented on a general-purpose computer using appropriate software instructions, or as hardware circuits, or as mixed hardware-software combinations (wherein, for example, pixel manipulation and rendering is performed by dedicated hardware components).

What is claimed is:

1. A method of aligning sets of image frames, (i) each set being representative of a volume and comprising a series of frames digitally encoding contiguous planar slices of the volume, (ii) each image frame comprising a series of image points encoded electronically as a grid of pixels, and (iii) the sets including redundant volumetric subject matter, the method comprising the steps of a. automatically identifying common volumetric subject matter on a subregion level by systematically comparing pixels representing a subregion of a selected frame of a first frame set to pixels representing subregions of a plurality of frames of the second frame set in order to identify correspondences between subregions of the first frame set and subregions of the second frame set;

b. defining a field of three-dimensional translation vectors mapping each of a plurality of the first-set subregions to corresponding second-set subregions with the smallest mapping error;

c. deriving, from the translation vectors, a set of global vectors specifying translation and rotation between the common volumetric subject matter; and d. based on the global vectors, translating and rotating the first frame set such that the common volumetric subject matter encoded by the frame sets is aligned.

2. The method of claim 1 wherein the global vectors are derived according to steps comprising:

a. utilizing the translation vectors to generate a single rotation vector maximally consistent with the mapping vectors and relating the first volume to the second volume;

b. utilizing the mapping vectors to generate a single translation vector maximally consistent with the mapping vectors and relating the first volume to the second volume, the rotation and translation vectors encoding spatial displacement between the first and second volumes.

3. The method of claim 2 wherein the single rotation vector and the single translation vector are generated by a least-squares fit.

4. The method of claim 1 further comprising the step of preprocessing each set of frames to reduce high-frequency noise and to select for anatomical features of a predetermined size range.

5. The method of claim 4 wherein the preprocessing step comprises filtering with the Laplacian of a Gaussian.

6. A method of aligning sets of image frames, (i) each set being representative of a volume and comprising a series of frames digitally encoding contiguous planar slices of the volume, (ii) each image frame being represented as a pixelmap image datafile comprising a grid of pixels, and (iii) the sets including common volumetric subject matter, the method comprising the steps of:

a. defining, in a first frame of a first set, a search block comprising a plural number of pixels;

b. defining, at identical locations in each of a plurality of frames of a second set, a target window comprising a plural number of pixels at least as large as the number of pixels in the search block;

c. searching for common volumetric subject matter by comparing the pixels of the search block with the pixels of each of the target windows and deriving an error factor representative of image differences therebetween;

d. identifying common volumetric subject matter by selecting the target-window pixels associated with the smallest error factor;

e. defining a three-dimensional translation vector mapping the search block to the selected target-window pixels;

f. defining, in the first frame of the first set, a new search block comprising a group of pixels offset with respect to the previous search block;

g. repeating steps (b) through (e);

h. completing the search for common volumetric subject matter by repeating steps (f) and (g) until all of the pixels of the first frame of the first set have been defined in a search block;

i. deriving, from the translation vectors, a set of global vectors specifying translation and rotation between the common volumetric subject matter; and j. based on the global vectors, aligning the first frame set with the second frame set.

7. The method of claim 6 wherein the subject matter comprises features each having a size, the target window being larger than the size of the smallest feature.

8. The method of claim 6 wherein the search block has 256 pixels and the target windows each have 2304 pixels.

9. The method of claim 6 wherein the global vectors are derived according to steps comprising:

a. utilizing the translation vectors to generate a single rotation vector maximally consistent with the mapping vectors and relating the first volume to the second volume;

b. utilizing the mapping vectors to generate a single translation vector maximally consistent with the mapping vectors and relating the first volume to the second volume, the rotation and translation vectors encoding spatial displacement between the first and second volumes.

10. The method of claim 6 further comprising the step of preprocessing each set of frames to reduce high-frequency noise and to select for anatomical features of a predetermined size range.

11. The method of claim 10 wherein the preprocessing step comprises filtering with the Laplacian of a Gaussian.

12. The method of claim 6 wherein the new search window is offset with respect to the previous search window so as to be adjacent thereto.

13. Apparatus for aligning first and second sets of digitized image frames, each set being representative of a volume and comprising a series of frames digitally encoding contiguous planar slices of the volume, the sets including common volumetric subject matter, said apparatus comprising:

a. a first set of memory buffers for storing the first set of digitized frames;

b. a second set of memory buffers for storing the second set of digitized frames;

c. analysis means configured to:
i. identify common volumetric subject matter by systematically comparing groups of pixels from a selected frame of the first frame set to groups of pixels of a plurality of frames of the second frame set;

ii. define a field of three-directional translation vectors mapping each of a plurality of pixel groups of the first frame set to corresponding pixel groups of the second frame set with the smallest mapping error;

iii. derive, from the translation vectors, a set of global vectors specifying translation and rotation between the volumes; and iv. align, based on the global vectors, the pixels of the first frame set with the pixels of the second frame set such that the volumes encoded by the frame sets are aligned.

14. The apparatus of claim 13 wherein the analysis means is further configured to preprocess each set of frames to reduce high-frequency noise and to select for anatomical features of a predetermined size range.

15. Apparatus for aligning first and second sets of digitized image frames, each set being representative of a volume and comprising a series of frames digitally encoding contiguous planar slices of the volume, the sets including common volumetric subject matter, said apparatus comprising:

a. a computer memory comprising a first set of memory buffers for storing the first set of digitized frames and a second set of memory buffers for storing the second set of digitized frames;

b. analysis means configured to:
i. define, in a first memory buffer of the first set, a search block comprising a plural number of pixels;
ii. define, at identical locations in each of a plurality of memory buffers of the second set, a target window comprising a plural number of pixels at least as large as the number of pixels in the search block;
iii. search for common volumetric subject matter by comparing the pixels of the search block with the pixels of each of the target windows;
iv. derive an error factor representative of image differences therebetween;
v. identify common volumetric subject matter by selecting the target-window pixels associated with the smallest error factor;
vi. define and store, in the computer memory, a three-dimensional translation vector mapping the search block to the selected target-window pixels;
vii. define, in the first frame of the first set, a new search block comprising a group of pixels offset with respect to the previous search block;
viii. repeat (ii) through (vi);
ix. complete the search for common volumetric subject matter by repeating (vii) and (viii) until all of the pixels of the first frame of the first set have been defined in a search block;
xii. derive, from the translation vectors, a set of global vectors specifying translation and rotation between the common volumetric subject matter and store the global vectors in the computer memory; and
xiii. based on the global vectors, align the first frame set with the second frame set.

16. The apparatus of claim 15 wherein the subject matter comprises features each having a size, the target window being larger than the size of the smallest feature.

17. The apparatus of claim 15 wherein the search block has 256 pixels and the target windows each have 2304 pixels.

18. The method of claim 6 wherein the new search window is offset with respect to the previous search window to overlap therewith.

* * * * *